Jan. 12, 1960

N. CUSHMAN 2,921,281

TAPE WOUND MAGNETIC CORES

Filed Aug. 29, 1957

INVENTOR
Norton Cushman

BY Connolly and Hutz
ATTORNEYS

United States Patent Office
2,921,281
Patented Jan. 12, 1960

2,921,281

TAPE WOUND MAGNETIC CORES

Norton Cushman, Williamstown, Mass., assignor to Sprague Electric Company, North Adams, Mass., a corporation of Massachusetts Application August 29, 1957, Serial No. 680,959

4 Claims. (Cl. 336—213)

This invention relates to a magnetic core including two or more apertures, and more particularly relates to a tape wound core of this type.

Recent publications in the electronic art have described a device called a "Transfluxor" which includes a core of magnetic material having a nearly rectangular hysteresis loop and two or more apertures. The control of the transfer of flux between the three or more legs of this type of magnetic core provides means for storing and gating electrical signals. This device, for example, can control over an indefinitely long time the transmission of A.C. power in accordance with a level established by a single setting pulse. This level can have any value in a continuous range from no transmission to a maximum, thus affording either "on-off" or "continuous" stored control. This device also has high power transmission efficiency, short setting time, negligible coupling between setting and output circuits and sharp setting thresholds. Illustrative applications for this device are nondestructive read-out memory systems and channel selector switches.

This device is described in an article entitled "Transfluxor" published in the RCA Review of June 1955, pages 303–311 and in the IRE Transactions of March 1956, pages 321–332. The cores disclosed in these publications are all made of ferrite material including more than one aperture.

An objective of this invention is to provide a simple and economical structure for a transfluxor type of magnetic core having efficient operating characteristics.

In accordance with this invention a transfluxor core is made by winding magnetic tape about a cylinder to form an inner winding; and then winding magnetic tape in a path enclosing a projection disposed externally of the cylinder, and also enclosing the inner tape winding. This provides a simple and economical means of precisely controlling the amount and orientation of the magnetic material incorporated in the core.

Novel features and advantages of the present invention will become apparent to one skilled in the art from a reading of the following description in conjunction with the accompanying drawings in which.

Figure 1:
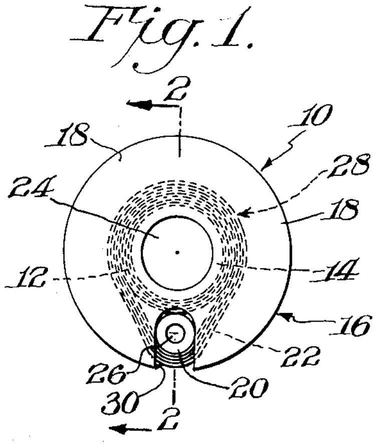
Fig. 1 is a plan view of an embodiment of this invention.
Figure 2:
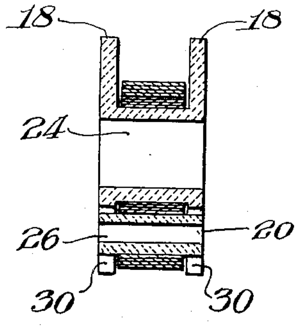
Fig. 2 is a cross-sectional view taken through Fig. 1 along the line 2—2 and looking in the direction of the arrows.

In Fig. 1 is shown a transfluxor-type magnetic core 10 which includes an inner winding 12 of magnetic tape wound about a cylinder 14 provided by a cylindrical bobbin 16 including a cylinder 14 and a pair of flanges 18. Bobbin 16 is made of non-magnetic material for example, a ceramic composition which is also an electrical insulator for insulating a winding (not shown) from the magnetic core.

A projecting element 20, made of a tube of ceramic material, for example, is mounted in a position which is externally disposed relative to cylinder 14 for supporting an outer tape winding 22 which is wrapped in a path enclosing the initial or inner tape winding 12 and projecting element 20. This provides a pair of apertures 24 and 26 within the composite tape wound core 28 which includes inner tape winding 12 and outer tape winding 22. Approximately one-half of the tape is deposited, for example, in the inner and outer windings.

Tube 20 constituting a projecting element external of cylinder 14 is, for example, also a cylinder of a diameter relatively smaller than the diameter of cylinder 14. It is supported externally with respect to cylinder 14 within a pair of cutouts 30 notched into aligned portions of flanges 18. Tube 20 lies within notches 30 and rests against the outer surface of inner winding 12 when the outer winding 22 is snugly wrapped about inner winding 12 and tube 20 and secured to itself, for example, by spot welding. The entire structure is thereby maintained firmly assembled.

Aperture 24 within bobbin 16 and aperture 26 within tube 20 provide convenient insulated means for connected electrical windings (not shown) upon the core. Since the amount of magnetic material can easily be controlled to a fine degree by regulating the length of tape utilized in each winding, and because the magnetic material can be concentrated in the paths which provide optimum operating characteristics; a transfluxor core made in this fashion can be simply and economically constructed to provide optimum operating efficiency and characteristics. The wide variety of available shapes in which the winding may be wound facilitates the provision of any special shape of magnetic path required for any desired functional magnetic properties.

What is claimed is:

1. A transfluxor structure comprising a cylinder of nonmagnetic material, a projecting element attached to said cylinder and disposed at a position external to the surface of said cylinder, magnetic tape being wound directly upon the surface of said cylinder to form an inner winding and in a path which encloses said inner winding and said projection to provide a tape wound magnetic core having more than one aperture, said cylinder being comprised of a bobbin of nonmagnetic material including a pair of flanges, and said projecting element being attached to said flanges.

2. A structure as set forth in claim 1 wherein aligned portions of said flanges are cut out to provide recesses for mounting said projecting element, said projecting element incorporates a tube of diameter relatively smaller than the diameter of said cylinder, and said tube is inserted within said recesses to bridge the space between said flanges.

3. A structure as set forth in claim 2 wherein said cylindrical bobbin and said tube are made of a ceramic material.

4. A transfluxor structure comprising a cylinder of nonmagnetic material, a projecting element attached to said cylinder and disposed at a position external to the surface of said cylinder, magnetic tape being wound directly upon the surface of said cylinder to form an inner winding and in a path which encloses said inner winding and said projection to provide a tape wound magnetic core having more than one aperture, said cylinder being comprised of a bobbin of nonmagnetic material including a pair of flanges, and said projecting element being inserted intimately between said flanges.

References Cited in the file of this patent

UNITED STATES PATENTS 2,391,229 O'Entremont ............ Dec. 18, 1945

FOREIGN PATENTS 221,046 Switzerland ............ Aug. 1, 1942